Feb. 24, 1931.   B. J. YANCHENKO   1,793,882
CABLE CONNECTER
Filed Dec. 22, 1926
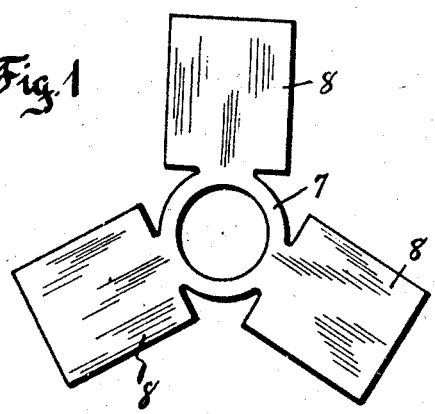
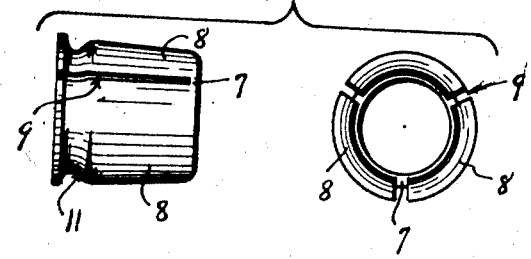
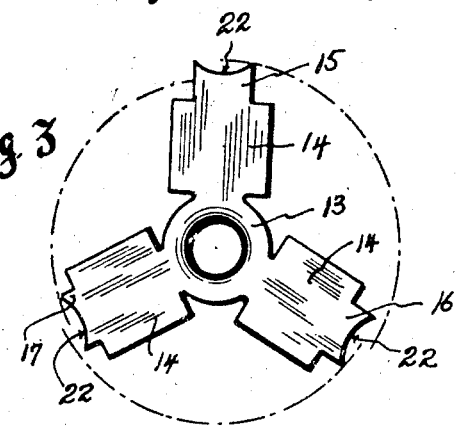
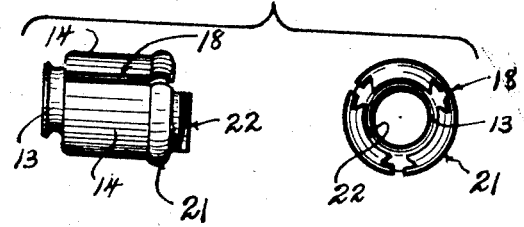
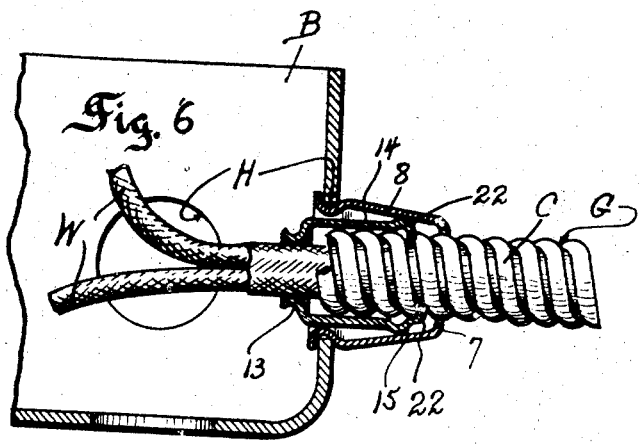
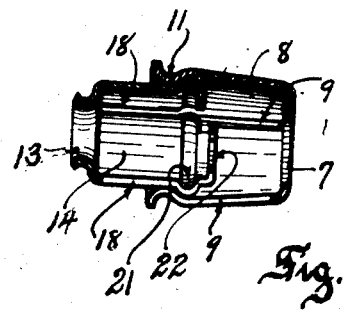
INVENTOR
*Basil J. Yanchenko*
BY
*Bohleber & Ledbetter*
ATTORNEYS Patented Feb. 24, 1931

1,793,882

UNITED STATES PATENT OFFICE

BASIL J. YANCHENKO, OF NEW YORK, N. Y., ASSIGNOR TO THE THOMAS & BETTS CO., OF ELIZABETH, NEW JERSEY, A CORPORATION OF NEW JERSEY

CABLE CONNECTER

Application filed December 22, 1926. Serial No. 156,291.

This invention relates to cable connecters adapted to universally anchor cable of all sizes and shapes, metal armored or fiber armored cable, to electric outlet boxes.

An object of the invention is to produce new operating means for a cable connecter so that the ordinary cable clamp screw and threaded aperture in a connecter will not be required.

Another object of the present invention is the provision of simple operating means to effect anchorage of the connecter in a box hole and secure the cable in the connecter. Accordingly an expansible connecter member such as a sleeve contains an expansible operating member which may also be a sleeve, the latter carrying cable gripping means, and the two telescoping parts are adapted to undergo relative longitudinal movement so that the assembly of the connecter with a cable will effect the anchorage of the connecter in a box hole and the gripping of the cable in the connecter. More particularly, wedge or cam surfaces are provided whereby the telescoping of the connecter sleeve and operating sleeve will expand one sleeve in a box hole and contract the other sleeve about the cable causing jaws to grip the cable and fasten it in the connecter.

Another object of the invention is the provision of a cable connecter which shall close that portion of the box hole not occupied by the cable to prevent the admission of dirt or plaster to the interior of the box. To this end the cable is disposed axially of the connecter and the telescoping connecter sleeves are formed with slidable coacting surfaces which engage and close the annular space between them while the cable gripping means or jaws carried with the inner operating sleeve member closes the space between the cable and the inner sleeve member. Thus various size cables may be fastened to various size box holes by one standard type connecter and this is accomplished without leaving an open space about the cable or connecter at the box hole.

The invention also seeks to protect the wire insulation against abrasion by the sharp ragged end edge of the armored cable. According to this aspect of the invention, the wires are adapted to pass through an annulus or bushing of constricted diameter, carried with the expansible operating member, which serves both as a stop for the armored cable and a guard for the insulation on the wires.

A still further object of the invention is the provision of a cable connecter adapted to secure armored cable formed of helically wound ribbon. The cable gripping means may therefore assume the form of inwardly directed jaws disposed respectively on a helix of a pitch equal to the pitch of the groove formed by the standard helically wound cable forming ribbon and adapted to engage therein, i. e. the jaws are adapted to enter and bite into the cable groove.

To the above ends an outer sleeve is preferably formed of a plurality of resilient segments unitary with a ring at the cable entering or outer end and formed with a box hole anchorage means such as a groove at the other end for expansion within a box hole by the operating member. An inside operating member may comprise a sleeve also formed of segments united by a bushing, the opposite ends of the several segments being inturned to form cable gripping jaws which are disposed, respectively, on a helix to bite within the groove found on standard helically ribbon wound cable. Means are provided in the outer and inner parts to expand the box hole edge anchorage means of the connecter and contract the jaws when the two parts are subjected to relative motion.

For a further understanding of the invention reference will be had to the following description, taken in connection with the accompanying drawing illustrating an embodiment and example of the invention.

Figure 1 shows a blank or stamping from which the connecter member is formed, i. e. the outer sleeve.

Figure 2 shows side and end views of the completed connecter sleeve made from the Figure 1 stamping before the inside operating sleeve is inserted.

Figure 3 is a view of the stamping from which the operating member is formed, i. e. the inner jaw and bushing sleeve.

Figure 4 shows views in side and end elevation of the completed operating member before it is inserted into the connecter sleeve.

Figure 5 is a longitudinal sectional view of the assembled connecter including the outer connecter sleeve and inner operating jaw sleeve.

Figure 6 is a view in longitudinal section showing the connecter mounted in an electric outlet box with an armored cable secured therein, i. e. a box assembly.

Electric outlet and fixture boxes B are made with knock-out openings or holes H to receive the cable C and connecters and by the use of this improved connecter the armored cable C having a spiral groove G is anchored in the box hole H and electrical wiring connections are made inside the box with the wires W coming from the cable in the usual way.

The cable connecter preferably includes a connecter sleeve which is conveniently formed from a resilient sheet metal blank comprising a ring 7 having integral therewith several, say three, rectangular sleeve forming sections 8 of substantially equal dimensions radiating from the ring and equally disposed apart in spaced relation. The sections 8 are bent at an angle to the sleeve end ring 7 and pressed to substantially cylindrical or frusto-conical form, their proximate side edges forming longitudinal slots 9 which permit contraction of the sleeve to enter a box hole H and subsequent expansion due to the resiliency of the metal, to engage the box hole edge H. Remote from the ring 7 the sections 8 are formed with grooves 11 or the like to effect anchorage of the connecter in a box hole. While a grooved sleeve is shown, other forms of connecter box and anchorage means may be used. This sleeve just described is formed like an open ended thimble and is adapted to receive an armored cable C.

Within the sleeve 8 is disposed an operating member performing a variety of functions, such as expanding the outer sleeve anchorage means 11 within the box hole; closing the box hole and sleeve against the admission of dirt or plaster into the interior of the box; clamping the cable within the sleeve 8; and guarding the wires W against the sharp edges of the cable. This operating member is thus named because it coacts with the connecter sleeve 8 to perform the several purposes recited, and it may to advantage be made in sleeve form.

An operating member or sleeve 14 is formed from a blank including a bushing ring 13 and a plurality of radiating sleeve forming plates 14 of equal dimensions and equidistantly disposed apart in spaced relation. The plates 14 are formed with reduced ends as necks 15, 16 and 17, respectively, curved at 22 their extremities and of a different length, radially and which are designed as cable gripping jaws 22. Considered, say in clockwise direction, the first neck 15 is the longest while the neck 17 is the shortest as shown in Figure 3 by the arcs X, Y and Z described about the center of the ring 13 and which arcs are respectively reduced in diameter from the greater arc X to the smaller arc Y. The sleeve forming plates 14 are the same length but their jaw forming extremities 15, 16, and 17 are preferably graduated in length so as to dispose the plurality of jaws on a helix.

The plates 14 are shaped to a substantially cylindrical or frusto-conical form, with their proximate sides defining lengthwise slots 18, which permit expansion and contraction of this inner sleeve at the jaw end. The ring 13 is contracted so that, while it forms a bushed passage for the wires W, it serves as a bushing and stop for the wire and cable C. The jaw forming necks 15, 16 and 17 are pressed outwardly to form an expanded shoulder 21 on the free end of the sleeve near or at the jaws 22 and again bent inwardly to form the cable gripping jaws 22.

These cable gripping jaws 22 are designed to engage within the armored cable groove and particularly that type of armored cable formed of a helically wound metallic ribbon which has the helical groove G as a result of the winding. Obviously, however, the jaws will grip any type of cable, armored or soft. The jaws 22 are adapted to enter the groove G when the operating sleeve 14 is contracted as by telescoping within the conic connecter sleeve 8 and thus prevent relative movement of the cable within the inner sleeve 14. To this end the jaw necks are made of different lengths and are so bent as to form inwardly directed jaws 22 disposed on a helix thereby to engage the helical groove G.

In use, the outer sleeve 8 is first contracted and inserted within a box hole H so that upon expansion the box hole anchorage groove 11 will engage the edge of the box hole. An armored cable C may then be passed through the outer sleeve end 7, whereupon the inside operating sleeve 14 is placed over the end of the cable from the left as viewed in the drawings with the wires W passing through the bushing ring 13 and with the jaws 22 projecting into or engaging in the spiral grooves G.

A pull on the cable C or telescoping of the operating sleeve 14 within the outer sleeve 8 will bring the shoulders 21 into sliding engagement against interior of the outer sleeve 8 thereby causing said outer sleeve 8 to expand and anchor itself within the box hole H, while at the same time the wedging action of the sleeve 8 against the shoulders 21 causes all the jaws 22 to move inwardly and firmly grip the cable C. The cable may then be secured to a stud or the like in the building whereupon the connecter will be securely anchored in the box hole and cable gripping jaws will establish a permanent clamping and holding action against the cable.

It will thus be seen that a cable connecter has been provided which is capable of being manufactured by simple stamping operation from a minimum of parts, there being no screw operating means to require additional parts or screw threading operations in manufacture or assembly. It is an inexpensive connecter.

Also it is seen that the connecter comprises two telescoping sleeves, each sleeve having an end which expands and contracts, and a rigid end which remains uniformly of the same diameter. The rigid ends are oppositely disposed and this is also true for the movable ends. Motion, in this case lengthwise, of one sleeve relative to the other causes one sleeve to contract around the cable to grip it and causes the other sleeve to expand and anchor itself in a box hole.

Since the inner sleeve 14 slides toward the ring end 7 of the conic sleeve 8, it follows that the anchorage end 11 of the main connecter sleeve 8 expands to completely fill the box hole H. The cable gripping jaws are forced toward the cable by the relative sliding action of the two parts whether the cable be large or small. Thus the connecter is universal to cable sizes and box hole sizes and completely closes the box hole and sleeve passages.

What I claim is:

1. As an article of manufacture, an operating member for a connecter comprising, a sleeve formed from a flat resilient metallic blank including rectangular plates radiating from a ring and formed, respectively, with cable gripping means.

2. A connecter comprising, an expansible open ended conical thimble provided with a peripheral box hole anchorage groove adjacent one end and provided with longitudinal slots running from the grooved end; an operating sleeve having a constricted end and also provided with longitudinal slots running from the unconstricted end, the slotted end being provided with a peripheral shoulder to engage the interior of the thimble and expand the same, and jaws upon sections formed by the slots spaced at regularly varying distances from the shoulder to engage a cable on a helix thereabout.

3. A connecter comprising, two telescoping sleeves, each of which includes a ring at one end carrying sleeve forming plates, the ring ends of the sleeves forming rigid sleeve ends which are placed in opposite direction, and the other sleeve ends being subject to contraction and expansion, cable gripping means carried with one sleeve and box anchorage means carried with the other sleeve, and operating means to render effective said gripping and anchorage means, said operating means including one sleeve of conic shape designed to engage the other sleeve to expand one and contract the other sleeve during longitudinal motion of one sleeve in the other.

4. As an article of manufacture, an operating member for a cable connecter comprising, a sleeve formed from a resilient blank including rectangular plates radiating from a ring and formed, respectively, with cable gripping means, and a shoulder formed upon said plates.

5. A cable connecter for spirally wound armored cable comprising a conical sleeve, box hole anchorage means upon said sleeve, an inner sleeve contractible to grip the cable by engagement with the conical sleeve and movable longitudinally with respect to the conical sleeve and means upon said inner sleeve to engage the spirals of an armored cable whereby rotation of the inner sleeve causes longitudinal movement thereof.

6. A cable connecter for spirally wound armored cable comprising a conical expansible sleeve, box hole anchorage means upon said sleeve, an inner contractible sleeve, said sleeves being expanded and contracted upon inter-engagement when moved relatively to each other to grip the box hole and cable, and means upon said inner sleeve to engage the spirals of an armored cable to cause relative longitudinal movement of the sleeves upon rotation of the inner sleeve.

7. A cable connecter for spirally wound armored cable comprising a conical sleeve, box hole anchorage means upon said sleeve, an inner sleeve having one end contractible by engagement with the conical sleeve upon relative longitudinal movement, means upon said contractible end to engage the spirals of the armored cable to cause relative longitudinal movement upon rotation of the inner sleeve, and said means serving also as cable gripping jaws.

8. A connecter comprising an outer sleeve expansible at one end, box hole anchorage means at the expansible end of the sleeve, an inner sleeve contractible at one end, cable gripping means at the contractible end, the expansible end of the outer sleeve being expanded to grip a box hole edge and the contractible end of the inner sleeve being contracted to grip a cable upon relative longitudinal movement of the sleeves.

9. A connecter comprising an outer sleeve expansible at one end, box hole anchorage means at the expansible end of the sleeve, an inner sleeve contractible at one end, cable gripping means at the contractible end, and said sleeves coacting to expand the outer sleeve to grip a box hole edge and to contract the inner sleeve to grip a cable.

10. A connecter comprising, an outer connecter sleeve expansible at one end provided with a box hole anchorage groove at the expansible end, and an inner sleeve contractible at one end within the first named sleeve, inwardly directed cable gripping jaws included on the inner sleeve, said sleeves coacting to close the jaws and expand the anchorage groove, a bushing included at one end in the inner sleeve, and a ring included at one end of the outer sleeve through which cable is received, the bushing and ring being at opposite ends of the connecter.

11. A connecter comprising an outer sleeve expansible at one end, box hole anchorage means at the expansible end of the sleeve, an inner conical surface upon said outer sleeve, an inner sleeve contractible at one end, cable gripping means at the contractible end, and said contractible end of the inner sleeve engaging the conical surface of the outer sleeve upon relative longitudinal movement to expand the outer sleeve to grip a box hole edge and to contract the inner sleeve to grip a cable.

12. A connecter comprising an outer sleeve, longitudinal slots in said sleeve extending from one end thereof rendering the end expansible, box hole anchorage means on the slotted end of the outer sleeve, an inner sleeve, longitudinal slots extending from one end thereof, cable gripping means upon said slotted end of the inner sleeve, and said sleeves coacting to expand the outer sleeve to grip a box hole edge and to contract the inner sleeve to grip a cable.

13. A connecter comprising an outer sleeve expansible at one end, box hole anchorage means at the expansible end of the sleeve, an inner sleeve contractible at one end, cable gripping means at the contractible end, the expansible end of the outer sleeve being expanded to grip a box hole edge and the contractible end of the inner sleeve being contracted to grip a cable upon relative longitudinal movement of the sleeves, and means to move the inner sleeve relatively to the outer sleeve.

14. A connecter comprising an outer sleeve expansible at one end, box hole anchorage means at the expansible end of the sleeve, an inner conical surface upon said outer sleeve, an inner sleeve contractible at one end, cable gripping means at the contractible end, said contractible end of the inner sleeve engaging the conical surface of the outer sleeve upon relative longitudinal movement to expand the outer sleeve to grip a box hole edge and to contract the inner sleeve to grip a cable, and means to move the inner sleeve longitudinally within the outer sleeve.

15. A cable connecter for spirally wound armored cable comprising a conical sleeve, box hole anchorage means upon said sleeve, an inner sleeve contractible at one end, said inner sleeve being movable longitudinally of the conical sleeve and the contractible end being contracted upon engagement with the conical sleeve, and means upon said inner sleeve to engage the spirals of an armored cable whereby rotation of the inner sleeve causes longitudinal movement thereof.

16. A cable connecter for spirally wound armored cable comprising a conical sleeve, box hole anchorage means upon said sleeve, an inner sleeve, longitudinal slots extending from one end forming a contractible end, cable gripping means on the contractible end of the inner sleeve, the inner sleeve contacting with the conical sleeve upon relative longitudinal movement of the sleeves to contract the inner sleeve, and means upon said inner sleeve to engage the spirals of an armored cable whereby rotation of the inner sleeve causes longitudinal movement thereof.

17. A cable connecter for spirally wound armored cable comprising a conical outer sleeve, longitudinal slots extending from one end forming an expansible end, box hole anchorage means on the expansible end, an inner sleeve, longitudinal slots extending from one end forming a contractible end, cable gripping means on the contractible end of the inner sleeve, the inner sleeve contacting with the conical sleeve upon relative longitudinal movement of the sleeves to contract the inner sleeve and expand the outer sleeve, and means upon said inner sleeve to engage the spirals of an armored cable whereby rotation of the inner sleeve causes longitudinal movement thereof.

18. A cable connecter for spirally wound armored cable comprising a conical outer sleeve, longitudinal slots extending from one end forming an expansible end, box hole anchorage means on the expansible end, an inner sleeve, longitudinal slots extending from one end forming a contractible end, the inner sleeve contacting with the conical sleeve upon relative longitudinal movement of the sleeves to contract the inner sleeve and expand the outer sleeve, and means upon said contractible end to engage the spirals of the armored cable to cause relative longitudinal movement upon rotation of the inner sleeve, and said means serving also as cable gripping jaws.

19. A cable connecter for spirally wound armored cable comprising a conical outer sleeve, longitudinal slots extending from one end forming an expansible end, box hole anchorage means on the expansible end, an inner sleeve, longitudinal slots extending from one end forming a contractible end, the inner sleeve contacting with the conical sleeve upon relative longitudinal movement of the sleeves to contract the inner sleeve and expand the outer sleeve, the inner sleeve being disposed within the outer sleeve with the unslotted ends of the sleeves at the ends of the connecter, means upon said contractible end to engage the spirals of the armored cable to cause relative longitudinal movement upon rotation of the inner sleeve, and said means serving also as cable gripping jaws.

20. A cable connecter for spirally wound armored cable comprising a conical outer sleeve, longitudinal slots extending from one end forming an expansible end, box hole anchorage means on the expansible end, an inner sleeve, longitudinal slots extending from one end forming a contractible end, the inner sleeve contacting with the conical sleeve upon relative longitudinal movement of the sleeves to contract the inner sleeve and expand the outer sleeve, the inner sleeve being disposed within the outer sleeve with the unslotted ends of the sleeves at the ends of the connecter, and inwardly projecting prongs upon the contractible end of each plate formed by the longitudinal slots of the inner sleeve, said prongs being biased corresponding to the spiral of the armored cable for engagement therewith to cause relative longitudinal movement upon rotation of the inner sleeve, said prong serving also as cable gripping means.

In testimony whereof I affix my signature.

BASIL J. YANCHENKO.